United States Patent [19]

Dolland et al.

[11] 4,351,022
[45] Sep. 21, 1982

[54] COMBINATIONAL LOGIC FOR GENERATING GATE DRIVE SIGNALS FOR PHASE CONTROL RECTIFIERS

[76] Inventors: Alan M. Lovelace, Administrator of the National Aeronautics and space Administration, with respect to an invention of Carlisle R. Dolland, Torrance; Daniel W. Trimble, La Habra, both of Calif.

[21] Appl. No.: 280,154

[22] Filed: Jun. 30, 1981

[51] Int. Cl.³ .............................................. H02P 13/26
[52] U.S. Cl. ....................................... 363/87; 318/803
[58] Field of Search .................... 318/803; 363/34, 37, 363/87, 129

[56] References Cited
U.S. PATENT DOCUMENTS

| | | | |
|---|---|---|---|
| 4,044,295 | 8/1977 | Ferraiolo et al. | 363/87 X |
| 4,066,938 | 1/1978 | Turnbull | 363/37 X |
| 4,156,896 | 5/1979 | Weiss | 363/87 |
| 4,164,015 | 8/1979 | Espelage et al. | 363/87 |
| 4,238,821 | 12/1980 | Walker | 363/37 X |

*Primary Examiner*—William M. Shoop

*Attorney, Agent, or Firm*—J. H. Beumer; J. R. Manning; L. D. Wofford, Jr.

[57] ABSTRACT

Control signals for phase-delay rectifiers, which require a variable firing angle that ranges from 0° to 180°, are derived from line-to-line 3-phase signals ($\phi A$, $\phi B$, $\phi C$) and both positive and negative firing angle control signals ($+\alpha$ and $-\alpha$) which are generated by comparing (at 20) current command and actual current (sensed at 16). Line-to-line phases are transformed (32) into line-to-neutral phases and integrated (at 34) to produce 90° phase delayed signals ($A\phi$, $B\phi$, and $C\phi$) that are inverted (at 26a, b, c) to produce three cosine signals (C, A and B RAMP) such that for each its maximum occurs at the intersection of positive half cycles of the other two phases which are inputs to other inverters. At the same time, both positive and negative (inverted) phase sync signals are generated for each phase by comparing (at 27a, b, c) each with the next and producing a square-wave when it is greater. Ramp, sync and firing angle control signals are then used in combinational logic (FIG. 5) to generate the gate firing control signals for SCR gate drives (30) which fire SCR devices in a bridge circuit (24).

12 Claims, 6 Drawing Figures

COMBINATIONAL LOGIC FOR GENERATING GATE DRIVE SIGNALS FOR PHASE CONTROL RECTIFIERS

ORIGIN OF INVENTION

The invention described herein was made in the performance of work under a NASA contract and is subject to the provisions of Section 305 of the National Aeronautics and Space Act of 1958, Public Law 85-68 (72 Stat. 435; 42 USC 2457).

BACKGROUND OF THE INVENTION

This invention relates to a system for generating the control signals for phase-delay rectifiers, and more particularly to the use of combinational logic to implement gate firing control for phase-delay rectifiers which require a variable firing angle that ranges from near 0° to near 180°.

In the speed control of a permanent magnet brushless motor, it is sometimes necessary to convert 3-phase power to direct current using a phase-delay rectifier (PDR) and then to change the direct current to alternating current using a line commutated inverter. The PDR is designed to provide a controlled current source for the line commutated inverter. The inverter provides the necessary 3-phase current to the motor windings and is synchronized with back emf by means of electronic switches.

The current to the motor is sensed to produce a signal that is compared with a current command signal; the difference is an error signal ($\alpha$-control) applied to the PDR to produce a firing angle in a range from 0° to 180°. Any decrease from a desired motor speed results in a decrease in the PDR firing angle which in turn causes an increase in the PDR output voltage for increased current to the motor, and vice versa. This permits speed control of the motor by control of the current command signal.

The output voltage of a PDR is proportional to the cosine of the firing angle. Consequently, if a cosine ramp signal synchronized with the ac power phase is used in the generation of the firing angle, the output voltage becomes a linear function of the firing angle. For a given SCR relating to a given phase of a 3-phase PDR, this cosine ramp for each of the three power phases is a cosine waveform whose positive and negative maxima occur at the intersections of the other two phases. This ramp can thus be used to generate the SCR gate firing pulse. This is accomplished by comparing the $\alpha$-control signal with the cosine ramp for the SCR to determine when cosine ramp exceeds the $\alpha$-control signal to control the correct time for firing the SCR in a 3-phase bridge. In practice both positive and negative SCR devices are provided for a fullwave SCR bridge using a cosine ramp and both positive and negative $\alpha$-control signals for the two SCRs associated with positive and negative half cycles of each power phase.

The prior art integrates the 3-phase line voltages and at the phase angle prescribed by a threshold comparator sets a flip-flop or triggers a one-shot to generate a firing signal. When the next phase reaches the threshold, its threshold comparator sets its flip-flop, or triggers its one-shot, which at the same time resets the previously set flip-flop or one-shot. The problem with that prior-art arrangement is that a spurious noise signal can set a flip-flop, or trigger a one-shot. That could generate a firing signal prematurely, causing motor current and consequently motor speed to change spuriously.

OBJECT AND SUMMARY OF THE INVENTION

An object of this invention is to use available line phase and other information in combinational logic to generate firing control signals for phase control rectifiers. Any spurious signal that might then cause a firing signal to be generated would do so only for the duration of the spurious signal. Thus, some filtering can be utilized. Combinational logic also facilitates the utilization of large scale integrated (LSI) circuit techniques to implement a PDR.

In accordance with this and other objects of the invention, all phases of ac multiphase line voltage are first conditioned by a delta-Y transformer to produce line-to-neutral signals referenced to control system ground, and then integrated to produce cosine waveforms $A\phi$, $B\phi$, $C\phi$. These cosine waveforms are inverted and used as C, A and B RAMP signals, respectively, in the PDR. The RAMP signals are compared in amplitude with a dc control signal, $\alpha$, in order to generate the precise firing angle for each phase-control rectifier switch of the PDR. The resulting comparator (COMP) waveform is a signal which is combined with a synchronizing (SYNC) squarewave signal derived from the voltage comprison of two appropriate phase-to-neutral waveforms. These waveforms are defined by the following equations.

$$\text{FIRE A}+ = (A + \cdot \overline{B+}) + (\overline{C+} \cdot \overline{B+} \cdot - A\phi \text{ SYNC}) \quad (1)$$

$$\text{FIRE B}+ = (B + \cdot \overline{C+}) + (\overline{C+} \cdot \overline{A+} \cdot - B\phi \text{ SYNC}) \quad (2)$$

$$\text{FIRE C}+ = (C + \cdot \overline{A+}) + (\overline{A+} \cdot \overline{B+} \cdot - C\phi \text{ SYNC}) \quad (3)$$

where:
- $-A\phi$ SYNC $= C\phi > A\phi$
- $-B\phi$ SYNC $= A\phi > B\phi$
- $-C\phi$ SYNC $= B\phi > C\phi$
- $A+ = +A\phi$ SYNC·COMP 1
- $B+ = +B\phi$ SYNC·COMP 2
- $C+ = +C\phi$ SYNC·COMP 3
- COMP 1 $= +\alpha$ CONTROL $>$ A RAMP
- COMP 2 $= +\alpha$ CONTROL $>$ B RAMP
- COMP 3 $= +\alpha$ CONTROL $>$ C RAMP For a fullwave SCR bridge, corresponding SCR firing control signals are provided for negative half cycles of each phase according to the following equations.

$$\text{FIRE A}- = (A - \cdot \overline{B-}) + (\overline{C-} \cdot \overline{B-} \cdot + A\phi \overline{\text{SYNC}}) \quad (4)$$

$$\text{FIRE B}- = (B - \cdot \overline{C-}) + (\overline{C-} \cdot \overline{A-} \cdot + B\phi \overline{\text{SYNC}}) \quad (5)$$

$$\text{FIRE C}- = (C - \cdot \overline{A-}) + (\overline{A-} \cdot \overline{B-} \cdot + C\phi \overline{\text{SYNC}}) \quad (6)$$

where:
- $A- = -A\phi$ SYNC·COMP 4
- $B- = -B\phi$ SYNC·COMP 5
- $C- = -C\phi$ SYNC·COMP 6 and

- COMP 4 $= -\alpha$ control $>$ A RAMP
- COMP 5 $= -\alpha$ control $>$ B RAMP
- COMP 6 $= -\alpha$ control $>$ C RAMP For immunity from noise the second term in parenthesis for each firing signal (equations 1 to 6) may be combined in an AND gate with the complement of a comparator of the $\alpha$-control signal of an adjacent phase, and for even greater immunity, each firing signal may be inhibited by the complement of an adjacent phase. The equations for combinational logic which include terms for both types of noise immunity are as follows:

$$\text{FIRE } A+ = [(A+\cdot\overline{B+}) + (\overline{C+\cdot B+})\cdot -A\phi \\ \text{SYNC}\cdot\overline{\text{COMP 2}})]\cdot(\overline{\text{FIRE B+}})$$

$$\text{FIRE } B+ = [(B+\cdot\overline{C+}) + (\overline{C+\cdot A+})\cdot -B\phi \\ \text{SYNC}\cdot\overline{\text{COMP 3}})]\cdot(\overline{\text{FIRE C+}})$$

$$\text{FIRE } C+ = [(C+\cdot\overline{A+}) + (\overline{A+\cdot B+})\cdot -C\phi \\ \text{SYNC}\cdot\overline{\text{COMP 1}})]\cdot(\overline{\text{FIRE A+}})$$

$$\text{FIRE } A- = [(A-\cdot\overline{B-}) + (\overline{C-\cdot B-})\cdot +A\phi \\ \text{SYNC}\cdot\overline{\text{COMP 5}})]\cdot(\overline{\text{FIRE B-}})$$

$$\text{FIRE } B- = [(B-\cdot\overline{C-}) + (\overline{C-\cdot A-})\cdot +B\phi \\ \text{SYNC}\cdot\overline{\text{COMP 6}})]\cdot(\overline{\text{FIRE C-}})$$

$$\text{FIRE } C- = [(C-\cdot\overline{A-}) + (\overline{A-\cdot B-})\cdot +C\phi \\ \text{SYNC}\cdot\overline{\text{COMP 4}})]\cdot(\overline{\text{FIRE A-}})$$

Immunity from noise is provided by negating the possibility of a fire control signal when an adjacent fire control signal is being generated. For example, positive and negative phase fire A control is negated by respective positive and negative phase fire B control inverted, so while FIRE B+ and FIRE B— are being generated, FIRE A+ and FIRE A— cannot be spuriously generated. Further immunity could be assured by adding as additional terms to FIRE A+ and FIRE A— the respective terms $\overline{\text{FIRE C+}}$ and $\overline{\text{FIRE C—}}$, where the bars indicate that the complements of the signals are true, so that FIRE A+ and FIRE A— can be generated only while none of the other phase fire control signals are true. Within the entire terms enclosed in brackets, the second term in parenthesis is similarly provided with immunity from noise by negating the term with a COMP signal of an adjacent phase.

Combinational logic is thus employed to produce a firing signal for the phase controlled rectifier switch at an angle that can vary from 0° to 180° without the use of multivibrators (bistable or monostable) or capacitors. At the minimum firing angle (0°), maximum dc current is delivered to a load, such as an inverter for a permanent magnet brushless motor. The dc current thus produced is compared to a current command signal to produce the control signal α which is compared to the ramp. Since previous mechanizations require the use of capacitors, LSI mechanizations which have become practicable were not realizeable prior to the present invention.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
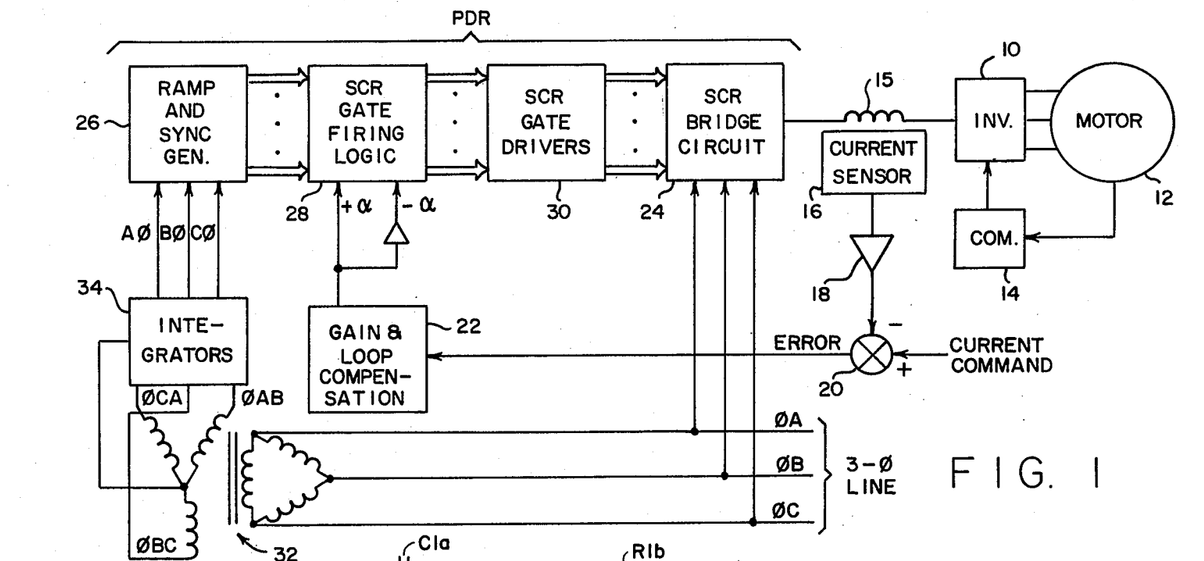
FIG. 1 is a block diagram illustrating an exemplary environment for the present invention.

Referring now to FIG. 1 of the drawings, 3-phase power from a utility line is converted to dc power by a phase-delay rectifier (PDR) which delivers the resulting dc current to an inverter 10 for a permanent magnet brushless motor 12 using a commutator 14 through a dc link (choke) 15. Any change in the desired motor speed requires a change in the dc link current. A current sensor 16, such as a Hall effect device, provides a feedback signal through an amplifier 18 for comparison with a current command signal in a comparator 20. The error signal thus produced is then applied to a gain and loop compensation network 22 which generates α-control signals (+α, —α) utilized to control the PDR firing angle, and thereby control the dc link current.

The PDR utilizes an SCR fullwave bridge circuit 24 to transfer 3-phase line power to the dc link. The bridge circuit is comprised of six silicon controlled rectifiers, two for each of the three phases of the line voltage, one each for the positive and negative half-cycles, in a conventional manner. Unlike the inverter which operates with a fixed phase angle less than 90°, the PDR operates with a variable phase angle from 0° to 180°. In essence, the phase angle is controlled by the error signal which is compared to a cosine ramp waveform generated by a ramp and sync generator 26. The comparison is carried out by an SCR gate firing logic network 28 which receives from the ramp generator 26 not only the cosine ramp waveforms for every phase, but also two square-wave sync signals for every phase of the 3-phase power. The synchronized comparison of the cosine ramp waveforms with the α-control signals produces firing pulses for the SCR devices of the bridge 24 through SCR gate drivers (solid-state switches) 30.

The dc output voltage of a PDR is proportional to the cosine of the firing angle. When a cosine ramp waveform is used to generate the gate firing pulses, the output voltage becomes a linear function of the firing angle from 0° to 180°, as noted hereinbefore with reference to the prior art. The present invention accomplishes that with combinational logic which thus imposes direct control of the SCR gate drivers at all times without the use of multivibrators which, in the prior art, are triggered at the right phase angle and remain so until commutated, thus making it possible for an SCR gate driven to be spuriously triggered by noise, and once triggered would remain on until commutated. Before describing this combinational logic with reference to FIG. 5, the nature of the signals employed in the logic network will first be described with reference to FIGS. 2, 3 and 4.

Figure 2:
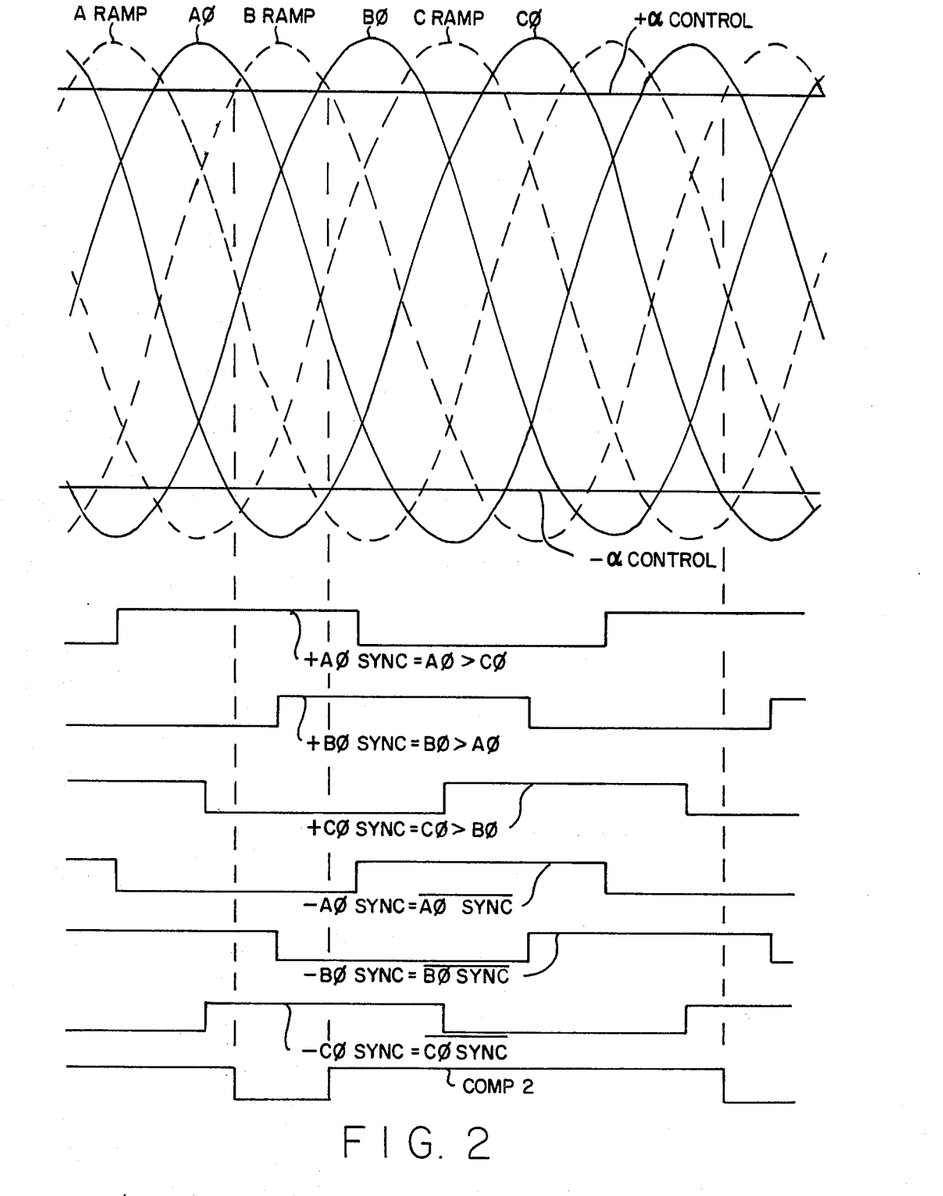
FIG. 2 is a waveform timing diagram useful in understanding the operation of the present invention.
Figure 3:
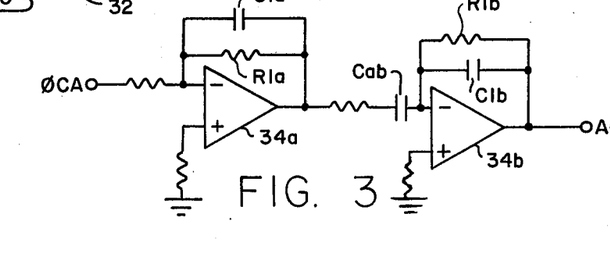
FIG. 3 is a circuit diagram for one of three integrators in the system of FIG. 1, the other two being identical.

FIG. 2 illustrates three signals (Aφ, Bφ and Cφ) derived from the utility line phases transformed from line-to-line phases (φA, φB and φC) to line-to-neutral phases (φAB, φBC and φCA) by a delta-Y connection of a 3-phase transformer 32 and then to the cosine signals (Aφ, Bφ and Cφ) by integrators 34 of which one is shown in FIG. 3. Each integrator is implemented by two operational amplifiers 34a and 34b as shown for the signal φA in FIG. 3. The first operational amplifier 34a includes a large feedback capacitor C1a (1.5 microfarads) in parallel with a resistor R1a to produce a phase shift of approximately 90°. The second operational amplifier 34b is ac coupled to the first by a capacitor Cab to remove any dc offset voltage. The second operational amplifier 34b includes a small capacitor C1b (100 picofarads) in parallel with a resistor R1b for attenuating high frequency noise. The result is an output waveform that is phase shifted 90° from phase of the input waveform. Thus, the integrators 34 produce signals $A\phi$, $B\phi$ and $C\phi$ of FIG. 2 which lag the line-to-line phases by 90°.

Figure 4:
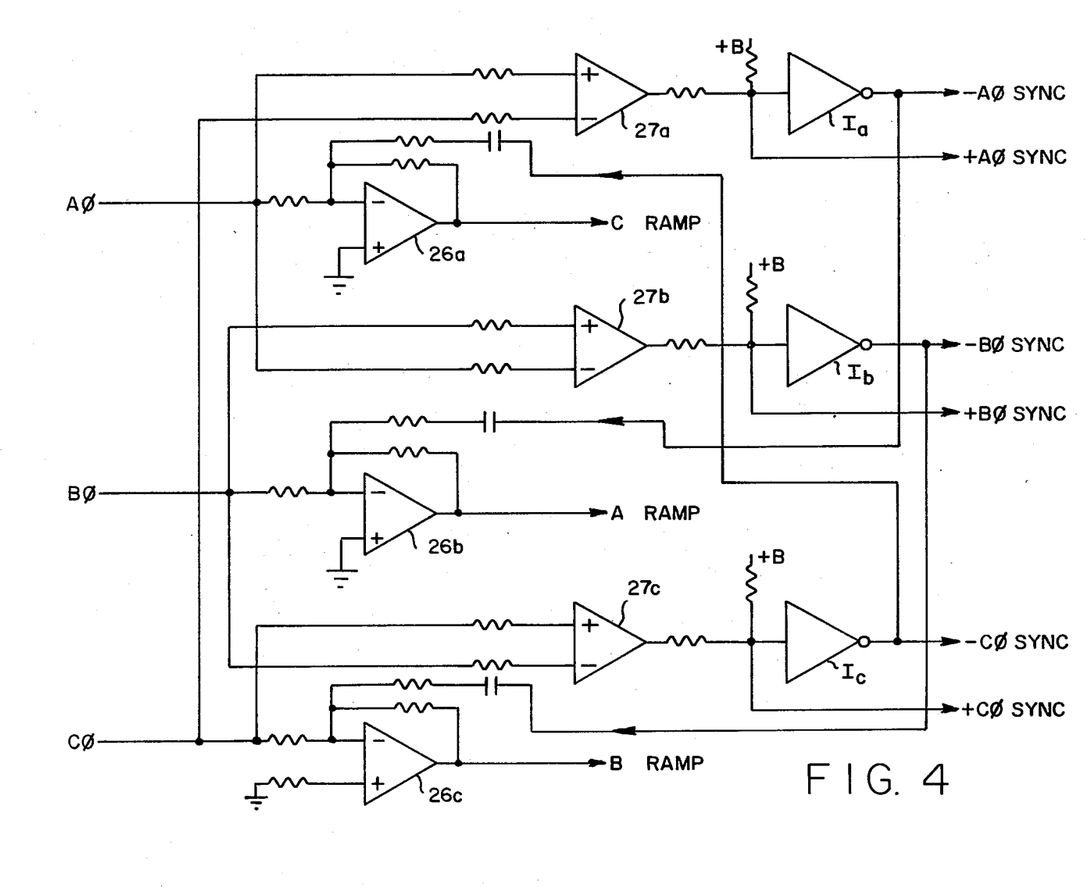
FIG. 4 is a circuit diagram for the ramp and sync generator in the system of FIG. 1.

The three cosine ramp signals required by the PDR gate logic circuit are shown in FIG. 2 as dashed-line waveforms labeled A RAMP, B RAMP and C RAMP. These waveforms are generated by the ramp and sync generator 26 implemented as shown in FIG. 4. The circuit utilizes three operational amplifiers 26a, 26b and 26c for generating the cosine ramp signals, and three comparators 27a, 27b and 27c for generating the sync signals. Note that the $A\phi$ signal is inverted by the amplifier 26a, so that its maximum output occurs at the intersection of positive half cycles of the other two phase signals, $B\phi$ and $C\phi$. This inverted signal at the output of the amplifier 26a serves as the C RAMP signal, i.e., as the RAMP of the $C\phi$ signal. Similarly, the $B\phi$ and $C\phi$ signals are inverted by amplifiers 26b and 26c to form A RAMP and B RAMP signals, respectively. Note that each ramp signal leads its corresponding phase signals by 60°.

The amplifiers 27a, 27b and 27c compare the phase signals $A\phi$, $B\phi$ and $C\phi$ in pairs to generate the phase sync signals according to the following equations:

$$+A\phi \text{ SYNC} = A\phi > C\phi$$

$$+B\phi \text{ SYNC} = B\phi > A\phi$$

$$+C\phi \text{ SYNC} = C\phi > B\phi$$

Inverters $I_a$, $I_b$ and $I_c$ provide the inverses $-A\phi$ SYNC, $-B\phi$ SYNC and $-C\phi$ SYNC. All six sync signals are utilized, together with the comparison of the cosine ramp signals with the $+\alpha$ and $-\alpha$ control signals, to generate the firing signals according to the following logic equations:

$$\text{FIRE } A+ = [(A+\cdot\overline{B+})+(\overline{C+}\cdot\overline{B+})\cdot -A\phi \text{ SYNC}\cdot\overline{\text{COMP 2}})]\cdot(\overline{\text{FIRE B}+})$$

$$\text{FIRE } B+ = [(B+\cdot\overline{C+})+(\overline{C+}\cdot\overline{A+})\cdot -B\phi \text{ SYNC}\cdot\overline{\text{COMP 3}})]\cdot(\overline{\text{FIRE C}+})$$

$$\text{FIRE } C+ = [(C+\cdot\overline{A+})+(\overline{A+}\cdot\overline{B+})\cdot -C\phi \text{ SYNC}\cdot\overline{\text{COMP 1}})]\cdot(\overline{\text{FIRE A}+})$$

$$\text{FIRE } A- = [(A-\cdot\overline{B-})+(\overline{C-}\cdot\overline{B-})\cdot +A\phi \text{ SYNC}\cdot\overline{\text{COMP 5}})]\cdot(\overline{\text{FIRE B}-})$$

$$\text{FIRE } B- = [(B-\cdot\overline{C-})+(\overline{C-}\cdot\overline{A-})\cdot +B\phi \text{ SYNC}\cdot\overline{\text{COMP 6}})]\cdot(\overline{\text{FIRE C}-})$$

$$\text{FIRE } C- = [(C-\cdot\overline{A-})+(\overline{A-}\cdot\overline{B-})\cdot +C\phi \text{ SYNC}\cdot\overline{\text{COMP 4}})]\cdot(\overline{\text{FIRE A}-})$$

where:

COMP 1 = $+\alpha$ CONTROL > A RAMP
COMP 2 = $+\alpha$ CONTROL > B RAMP
COMP 3 = $+\alpha$ CONTROL > C RAMP
COMP 4 = $-\alpha$ CONTROL > A RAMP
COMP 5 = $-\alpha$ CONTROL > B RAMP
COMP 6 = $-\alpha$ CONTROL > C RAMP and $A+ = +A\phi$ SYNC·COMP 1
$A- = -A\phi$ SYNC·COMP 4
$B+ = +B\phi$ SYNC·COMP 2
$B- = -B\phi$ SYNC·COMP 5
$C+ = +C\phi$ SYNC·COMP 3
$C- = -C\phi$ SYNC·COMP 6

All inverse FIRE terms $\overline{\text{FIRE A}+}$, $\overline{\text{FIRE A}-}$, $\overline{\text{FIRE B}+}$, etc., in the logic equations for the positive phase fire control signals FIRE A+, FIRE B+ and FIRE C+, and in the corresponding negative phase fire control signals FIRE A−, FIRE B− and FIRE C−, are included for greater immunity from noise, i.e., to minimize the possibility of spurious SCR firing due to noise. The complement output signals, such as $\overline{\text{FIRE A}+}$, $\overline{\text{FIRE B}+}$ and $\overline{\text{FIRE C}+}$ are generated in order to be able to differentially (push-pull) drive the SCR gate driver circuit. For example, an NPN and PNP switch series connected emitter to emitter in the SCR gate drivers 30 for the phase A+ are driven by respective FIRE A+, and $\overline{\text{FIRE A}+}$ signals.

Figure 5:
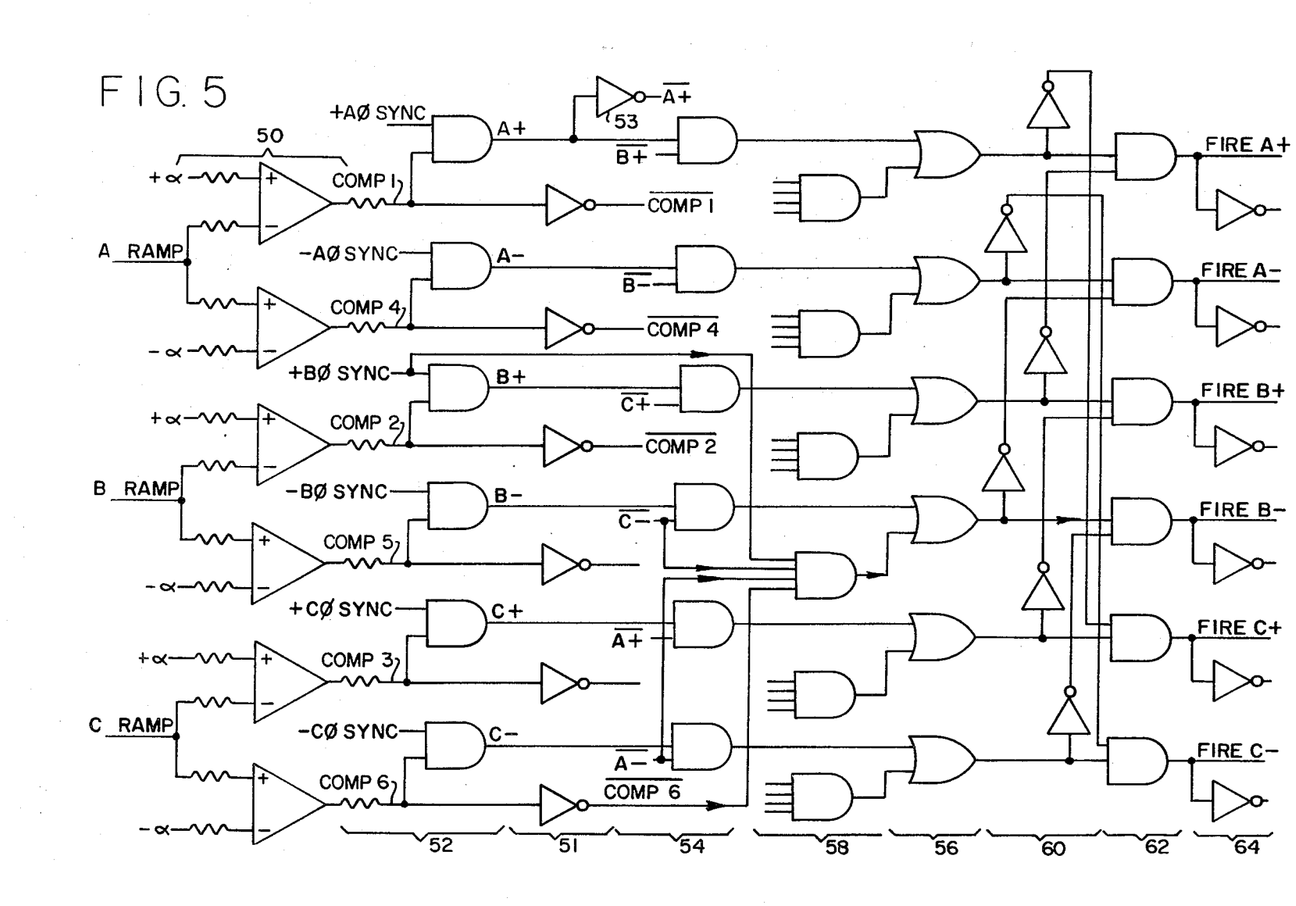
FIG. 5 is a logic diagram for the SCR gate firing logic, which implements the present invention.

The manner in which these logic equations are implemented for the signals FIRE A+, FIRE B+ and FIRE C+ (and their complements), and FIRE A−, FIRE B− and FIRE C− (and their complements), is shown in FIG. 5. Six comparators 50 compare the $+\alpha$ and $-\alpha$ control signals with the A, B and C RAMP signals and generate the COMP 1, 2, 3, 4, 5 and 6 signals. Inverters 51 at the output of the comparators generate the complements $\overline{\text{COMP 1}}$, $\overline{2}$, $\overline{3}$, $\overline{4}$, $\overline{5}$ and $\overline{6}$. Six two input AND gates 52 implement the logic equations for the terms A+, A−; B+, B−; and C+, C−, and six inverters 53 generate the complements $\overline{A+}$, $\overline{A-}$; $\overline{B+}$, $\overline{B-}$; and $\overline{C+}$, $\overline{C-}$. Six two input AND gates 54 generate the first term in parenthesis for the firing control equations from the outputs of the AND gates 52 and the inverters 53. Six OR gates 56 then combine these terms with the terms in the second parenthesis.

The terms in the second parenthesis are generated by six 4-input AND gates 58. For simplicity in the drawing, only one 4-input AND gate 58 is shown with the necessary connections for the second term in parenthesis of the control equation for FIRE B−.

The outputs of the OR gates 56 are effectively the control signals FIRE A+, FIRE A−, FIRE B+, FIRE B−, FIRE C+ and FIRE C−, and could be applied directly to the SCR gate drivers 30 (FIG. 1). However, for noise immunity, individual signals are inhibited by the AND gates 62 and through inverters 60 when system sequence of operation do not require them to be active. Thus FIRE A+ cannot occur during FIRE B+; FIRE B+ cannot occur during FIRE C+ and FIRE C+ cannot occur during FIRE A+. The mechanization for the fire control signals of the negative half cycles, namely the FIRE A−, FIRE B− and FIRE C− signals, is identical to that for the FIRE A+, FIRE B+ and FIRE C+ signals. Inverters 64 produce the complements of the final control signals for differential drive in the SCR gate drivers 30 (FIG. 1) as noted hereinbefore. The output of the gate drivers in turn drive the gate electrodes of the SCR devices in the PDR bridge circuit 24.

Figure 6:
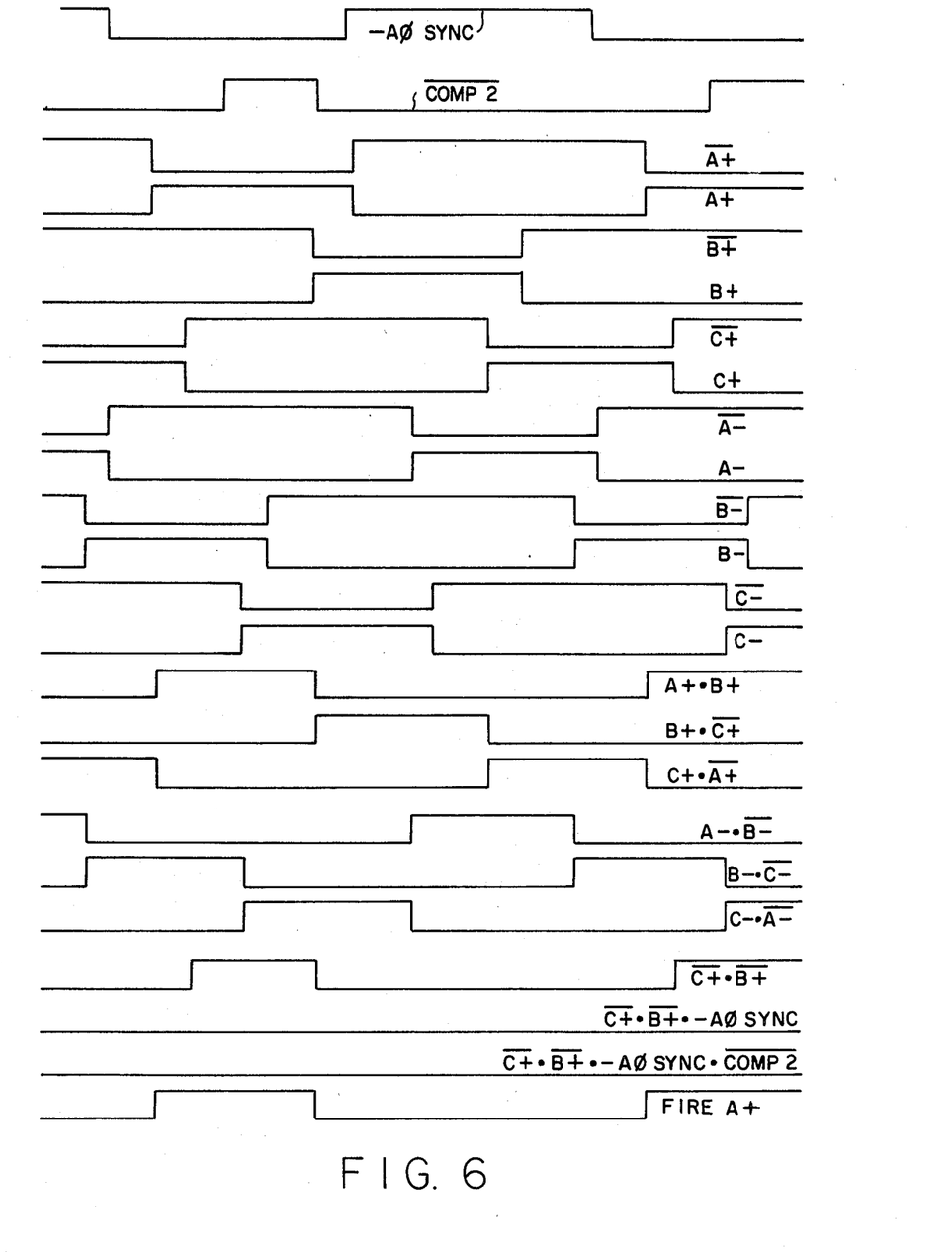
FIG. 6 is a waveform timing diagram useful with FIG. 2 for understanding the present invention.

A complete timing diagram of the gate control logic of FIG. 5 is given in FIG. 6. This diagram shows how the logic equations combine square waveforms to generate the fire control pulse FIRE A+ for $\alpha$-control at 30°. The other fire control pulses are similarly derived from the logic equations. The FIRE A+ waveform has a duration of 120° of input phase and is off for 240° of input phase. In understanding the waveform diagram, it should be first recalled that the +Aφ SYNC is derived by a comparator 27a shown in FIG. 4. Its inverse is then generated by the inverter Ia. The sync and inverse sync signal waveforms are shown in FIG. 2 for α-control at 30°. The COMP 2 signal is similarly generated by a comparator 50 and inverter 51, where the comparator compares the signal C RAMP with +α control. The waveform for COMP 2 produced by the comparator is shown in FIG. 2. Its inverse is then shown in FIG. 6 immediately after the waveform for the signals −Aφ SYNC reproduced from FIG. 2. Not shown in either FIG. 2 or FIG. 6, but similarly derived, are the signals COMP 1 and COMP 3 for the following conditions:

COMP 1 = +α CONTROL > A RAMP
COMP 3 = +α CONTROL > C RAMP

These signals COMP 1, 2 and 3 are used in AND gates 52 to derive the signals +A, +B and +C shown in FIG. 6. Their inverse signals are also shown since two of them are used in AND gates 54 and 58 to implement two AND functions in parenthesis. But it should be noted that since COMP 1, 2 and 3 are terms of A+, B+ and C+, the complements $\overline{COMP\ 2}$, $\overline{COMP\ 3}$ and $\overline{COMP\ 1}$ in the positive fire control signals FIRE A+, FIRE B+ and FIRE C+ are present simply to prevent the second term from generating a fire control signal for a given SCR relating to a given phase when some other phase is active thus yielding additional noise immunity. Similarly COMP 4, 5, and 6 are terms of A−, B− and C−, so the complements $\overline{COMP\ 4}$, $\overline{COMP\ 5}$ and $\overline{COMP\ 6}$ are included in the negative fire control signals FIRE A−, FIRE B− and FIRE C− for additional noise immunity. Having produced all of the waveforms necessary for the logic equation of the gate drive pulse FIRE A, the waveforms at the output of the AND gate 54 is then shown in the next waveform. Although there is not a discrete AND gate for the AND function C+·B+, because that function is carried out by a four input AND gate 58, it is nevertheless shown for clarity as the next waveform. Since, for this example, (α=30°) the signal −Aφ SYNC is low whenever the term C+·B+ is true, the AND function C+·B+ −Aφ SYNC is low (not true) at all times as shown in FIG. 6, and because it is low at all times, the AND function for the AND gate 58, which is $\overline{C+}\cdot\overline{B+} +\cdot −Aφ\ SYNC\ \overline{COMP\ 2}$ is also low at all times. For larger angles of about 90° to 180°, the four-input AND gates 58 will introduce logical signals to the OR gates 56, and thus make a contribution to the control signals for those larger firing angles. However, the simple case of a small firing angle (α=30°) illustrates the principle of operation for this combinational logic.

From the foregoing it is evident that the SCR gate firing logic implements the gate drive control required for a phase-control rectifier without the use of multivibrators (one-shots or flip-flops). Only linear integrated circuits and conventional logic are used. The system accepts line-to-line voltages and the positive and negative firing angle control signals (which are generated by comparing command current and actual current) and generates gate firing pulses which, as required by the current command, can be shifted between 0° and 180°.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In a phase-delay rectifier (PDR) having a silicon controlled rectifier (SCR) bridge circuit to transfer 3-phase line power to a dc link, wherein actual current in said link is compared with a current command for generating a firing angle control signal, α, applied to the PDR to produce a firing angle in a range from 0° to 180°, wherein the output voltage of the PDR is proportional to the cosine of the firing angle, and a cosine ramp signal for a given SCR relating to a given phase is used to generate the gate firing pulse for the SCR by comparing the difference signal, α-control, to said cosine ramp to determine the correct time for firing each SCR, an improvement comprising means responsive to said control signal, cosine ramp signals and phase signals of said 3-phase line power transformed into 90° phase delayed line neutral phase signals Aφ, Bφ and Cφ for producing firing control signals, for SCR switches in said bridge circuit, said means comprising means for comparing said phase signals Aφ, Bφ and Cφ with each other in pairs for producing squarewave signals +Aφ SYNC, +Bφ SYNC and +Cφ SYNC indicative of the 120° phase relationship of the separate lines of said 3-phase power, means for generating said cosine ramp signals, comparator means for comparing said α-control signal with each of said cosine ramp signals for generating a squarewave COMP signal from each of said cosine ramp signals that is high when said cosine ramp signals exceed said α-control signal, and combinational logic responsive to said COMP signals and said SYNC signals for producing said SCR firing control signals.

2. The improvement as defined in claim 1, including in said combinational logic for each firing control signal a squarewave signal from the combinational logic of a firing control signal of another phase to negate the generation of a firing control signal when the other firing control signal of said other phase is being generated for immunity from noise.

3. The improvement as defined in claim 2 wherein said squarewave signal is the firing control signal for the other phase.

4. The improvement as defined by claim 1 wherein said combinational means is defined by the logic equations:

FIRE A+ = (A+·$\overline{B+}$)+($\overline{C+\cdot B+}$·−Aφ SYNC)

FIRE B+ = (B+·$\overline{C+}$)+($\overline{C+\cdot A+}$·−Bφ SYNC)

FIRE C+ = (C+·$\overline{A+}$)+($\overline{A+\cdot B+}$·−Cφ SYNC)

where:
A+ = +Aφ SYNC·COMP-1
B+ = +Bφ SYNC·COMP-2
C+ = +Cφ SYNC·COMP-3
and

COMP 1 = +α control > A RAMP
COMP 2 = +α control > B RAMP
COMP 3 = +α control > C RAMP 5. The improvement as defined in claim 4 wherein said silicon controlled rectifier bridge circuit is a full-wave bridge circuit requiring corresponding SCR firing control signals for negative half cycles of each phase, and said negative SCR firing control signals are produced by a combinational logic circuit defined by the logic equations:

$$\text{FIRE } A- = (A- \cdot \overline{B-}) + (\overline{C-} \cdot \overline{B-} \cdot + A\phi \text{ SYNC})$$

$$\text{FIRE } B- = (B- \cdot \overline{C-}) + (\overline{C-} \cdot \overline{A-} \cdot + B\phi \text{ SYNC})$$

$$\text{FIRE } C- = (C- \cdot \overline{A-}) + (\overline{A-} \cdot \overline{B-} \cdot + C\phi \text{ SYNC})$$

where
 A− = −A$\phi$ SYNC·COMP 4
 B− = −B$\phi$ SYNC·COMP 5
 C− = −C$\phi$ SYNC·COMP 6
and COMP 4 = −$\alpha$ control > A RAMP
 COMP 5 = −$\alpha$ control > B RAMP
 COMP 6 = −$\alpha$ control > C RAMP 6. The improvement as defined in claim 5 wherein the second term in parenthesis of each fire control signal of like polarity has included a COMP signal resulting from the comparision of an $\alpha$-control signal of the same polarity, and the next phase ramp in sequence for the three phases of 3-phase power.

7. The improvement as defined in claim 6 wherein each phase fire control signal is inhibited by the inverse of an adjacent phase fire control signal for noise immunity.

8. The improvement as defined in claim 1, 2, 3, 4, 5, 6 or 7 wherein said SCR bridge circuit is a fullwave bridge circuit requiring corresponding SCR firing control signals for positive and negative half cycles of each phase and said positive and negative SCR firing control signals are produced in a strictly analogous way using a positive and negative $\alpha$-control signal for comparison with positive and negative half cycles of said phase signals A$\phi$, B$\phi$ and C$\phi$ for generation of said COMP signals, and using inverters to generate the inverses of said COMP signals.

9. In a phase-delay rectifier (PDR) having a silicon controlled rectifier (SCR) bridge circuit to transfer 3-phase line power to a dc link, wherein actual current in said link is compared with a current command for generating a firing angle control signal, $\alpha$, applied to the PDR to produce a firing angle in a range from 0° to 180°, wherein the output voltage of the PDR is proportional to the cosine of the firing angle, and a cosine ramp signal for a given SCR relating to a given phase is used to generate the gate firing phase for the SCR by comparing the difference signal to said cosine ramp to determine the correct phase for firing each SCR, an improvement comprising combinatinal logic circuit responsive to said $\alpha$-control signal, cosine ramp signals and phase signals of said 3-phase line power transformed into 90° phase delayed line neutral phase signals A$\phi$, B$\phi$ and C$\phi$ for producing SCR firing control signals, said combinational logic circuit being defined by the logic equations:

$$\text{FIRE } A+ = (A+ \cdot \overline{B+}) + (\overline{C+} \cdot \overline{B+} \cdot - A\phi \text{ SYNC})$$

$$\text{FIRE } B+ = (B+ \cdot \overline{C+}) + (\overline{C+} \cdot \overline{A+} \cdot - B\phi \text{ SYNC})$$

$$\text{FIRE } C+ = (C+ \cdot \overline{A+}) + (\overline{A+} \cdot \overline{B+} \cdot - C\phi \text{ SYNC})$$

where:
 −A$\phi$ SYNC = C$\phi$ > A$\phi$
 −B$\phi$ SYNC = A$\phi$ > B$\phi$
 −C$\phi$ SYNC = B$\phi$ > C$\phi$
 A+ = +A$\phi$ SYNC·COMP-1
 B+ = +B$\phi$ SYNC·COMP-2
 C+ = +C$\phi$ SYNC·COMP-3
and COMP 1 = +$\alpha$ control > A RAMP
 COMP 2 = +$\alpha$ control > B RAMP
 COMP 3 = +$\alpha$ control > C RAMP 10. The improvement as defined in claim 9 wherein said silicon controlled rectifier bridge circuit is a full-wave bridge circuit requiring corresponding SCR firing control signals for negative half cycles of each phase, and said negative SCR firing control signals are produced by a combinational logic circuit defined by the logic equations:

$$\text{FIRE } A- = (A- \cdot \overline{B-}) + (\overline{C-} \cdot \overline{B-} \cdot + A\phi \text{ SYNC})$$

$$\text{FIRE } B- = (B- \cdot \overline{C-}) + (\overline{C-} \cdot \overline{A-} \cdot + B\phi \text{ SYNC})$$

$$\text{FIRE } C- = (C- \cdot \overline{A-}) + (\overline{A-} \cdot \overline{B-} \cdot + C\phi \text{ SYNC})$$

where
 A− = −A$\phi$ SYNC·COMP 4
 B− = −B$\phi$ SYNC·COMP 5
 C− = −C$\phi$ SYNC·COMP 6
and COMP 4 = −$\alpha$ control > A RAMP
 COMP 5 = −$\alpha$ control > B RAMP
 COMP 6 = −$\alpha$ control > C RAMP 11. The improvement as defined in claim 9 or 10 wherein the second term in parenthesis of each fire control signal of like polarity has included a COMP signal resulting from the comparison of an $\alpha$-control signal of the same polarity and the next phase ramp in sequence for the three phases of 3-phase power.

12. The improvement as defined in claim 11 wherein each phase fire control signal is inhibited by the inverse of an adjacent phase fire control signal for noise immunity.

* * * * *